United States Patent
Wang

(10) Patent No.: US 12,232,117 B2
(45) Date of Patent: Feb. 18, 2025

(54) METHOD FOR INDICATING TIME DIFFERENCE BETWEEN PUCCH AND PDSCH, BASE STATION, AND READABLE MEDIUM

(71) Applicant: SPREADTRUM COMMUNICATIONS (SHANGHAI) CO., LTD., Shanghai (CN)

(72) Inventor: Hualei Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 724 days.

(21) Appl. No.: 17/265,992

(22) PCT Filed: Jun. 26, 2019

(86) PCT No.: PCT/CN2019/093017
§ 371 (c)(1),
(2) Date: Feb. 4, 2021

(87) PCT Pub. No.: WO2020/029702
PCT Pub. Date: Feb. 13, 2020

(65) Prior Publication Data
US 2021/0204280 A1    Jul. 1, 2021

(30) Foreign Application Priority Data
Aug. 8, 2018 (CN) .......................... 201810899698.3

(51) Int. Cl.
*H04W 72/21* (2023.01)
*H04L 1/1812* (2023.01)
*H04W 72/23* (2023.01)

(52) U.S. Cl.
CPC .......... *H04W 72/21* (2023.01); *H04L 1/1812* (2013.01); *H04W 72/23* (2023.01)

(58) Field of Classification Search
CPC ... H04L 1/1812; H04L 1/1854; H04L 1/1896; H04L 5/0044; H04L 5/0055; H04L 5/0094; H04W 72/21; H04W 72/23
See application file for complete search history.

(56) References Cited

U.S. PATENT DOCUMENTS

| | | | |
|---|---|---|---|
| 10,873,936 B2* | 12/2020 | Huang | H04L 5/0098 |
| 11,076,418 B2* | 7/2021 | Li | H04L 1/1812 |

(Continued)

FOREIGN PATENT DOCUMENTS

| | | |
|---|---|---|
| CN | 108271262 A | 7/2018 |
| CN | 108289015 A | 7/2018 |

(Continued)

OTHER PUBLICATIONS

U.S. Appl. No. 62/713,519 Drawings (Year: 2018).*

(Continued)

*Primary Examiner* — Dung B Huynh
(74) *Attorney, Agent, or Firm* — CANTOR COLBURN LLP

(57) ABSTRACT

A method for indicating a time difference between a PUCCH and a PDSCH, a base station, and a readable medium. The method for indicating a time difference between a PUCCH and a PDSCH comprises: determining whether a PDSCH-to-HARQ-timing-indicator field indicates a time difference between a PDSCH and a PUCCH which is used for feeding back HARQ-ACK; generating indication information according to the indication result; and indicating the indication information to the UE by means of downlink control information. By applying the solution, a UE is able to accurately acquire a time slot for feeding back HARQ-ACK while a time difference between a PDSCH and a PUCCH which is used for feeding back the HARQ-ACK is indicated by a PDSCH-to-HARQ-timing-indicator field.

8 Claims, 2 Drawing Sheets

```
whether a PDSCH-to-HARQ-timing-indicator field    ── S101
indicates the time difference between the PDSCH
and the PUCCH used to feed back HARQ-
ACK is determined, to obtain an indication result
                    │
                    ▼
    indication information is generated based on the    ── S102
                indication result
                    │
                    ▼
    the indication information is indicated to the UE    ── S103
         through downlink control information
```

(56) References Cited

U.S. PATENT DOCUMENTS

| | | | |
|---|---|---|---|
| 11,743,883 B2* | 8/2023 | Yun | H04W 72/0446 370/336 |
| 2013/0250772 A1* | 9/2013 | Yin | H04L 1/1822 370/280 |
| 2013/0301490 A1* | 11/2013 | He | H04B 7/0456 370/280 |
| 2014/0301290 A1* | 10/2014 | He | H04W 72/1215 370/329 |
| 2015/0173065 A1* | 6/2015 | Fu | H04W 52/545 370/280 |
| 2015/0189658 A1* | 7/2015 | Zhang | H04B 7/0619 370/335 |
| 2016/0285595 A1* | 9/2016 | Chen | H04L 5/0055 |
| 2017/0195031 A1* | 7/2017 | Onggosanusi | H04L 5/0048 |
| 2017/0230971 A1* | 8/2017 | Lee | H04L 1/1861 |
| 2018/0014301 A1 | 1/2018 | Chen et al. | |
| 2018/0279332 A1* | 9/2018 | Yun | H04W 72/0446 |
| 2018/0324770 A1* | 11/2018 | Nogami | H04L 5/005 |
| 2019/0074935 A1* | 3/2019 | Babaei | H04L 1/1854 |
| 2019/0110285 A1* | 4/2019 | Huang | H04W 72/0446 |
| 2019/0159251 A1 | 5/2019 | Li et al. | |
| 2019/0166409 A1* | 5/2019 | Takahashi | G08B 27/008 |
| 2019/0182807 A1* | 6/2019 | Panteleev | H04L 5/0048 |
| 2019/0190661 A1* | 6/2019 | You | H04W 74/0833 |
| 2019/0239187 A1* | 8/2019 | Islam | H04W 72/23 |
| 2019/0246416 A1* | 8/2019 | Park | H04W 72/21 |
| 2019/0268847 A1* | 8/2019 | Asterjadhi | H04W 52/0216 |
| 2019/0349899 A1* | 11/2019 | Ang | H04L 5/0055 |
| 2019/0349942 A1 | 11/2019 | Li et al. | |
| 2019/0363840 A1* | 11/2019 | Wang | H04L 1/1854 |
| 2019/0363842 A1 | 11/2019 | Fu et al. | |
| 2020/0037260 A1* | 1/2020 | Fu | H04W 52/146 |
| 2020/0037352 A1* | 1/2020 | Yang | H04L 1/1896 |
| 2020/0044783 A1* | 2/2020 | Vaidya | H04L 1/1864 |
| 2020/0044791 A1* | 2/2020 | Tsai | H04L 1/1854 |
| 2020/0044792 A1* | 2/2020 | Vaidya | H04L 47/34 |
| 2020/0107320 A1* | 4/2020 | Yan | H04L 1/1861 |
| 2020/0196346 A1* | 6/2020 | Khoshnevisan | H04L 5/0053 |
| 2020/0252978 A1* | 8/2020 | Yi | H04L 5/0044 |
| 2020/0351060 A1* | 11/2020 | Liang | H04L 1/1848 |
| 2020/0367279 A1* | 11/2020 | Lin | H04W 72/0446 |
| 2020/0374049 A1* | 11/2020 | Tang | H04W 72/0446 |
| 2021/0006377 A1* | 1/2021 | Hooli | H04L 1/1864 |
| 2021/0036825 A1* | 2/2021 | Choi | H04L 5/0048 |
| 2021/0051634 A1* | 2/2021 | Fakoorian | H04W 72/23 |
| 2021/0075556 A1* | 3/2021 | Karaki | H04L 1/1819 |
| 2021/0204280 A1* | 7/2021 | Wang | H04W 72/21 |
| 2021/0266939 A1* | 8/2021 | Takeda | H04W 72/1273 |
| 2021/0273752 A1* | 9/2021 | Takeda | H04L 1/1896 |
| 2021/0297191 A1* | 9/2021 | Takeda | H04L 1/1858 |
| 2021/0306107 A1* | 9/2021 | Yin | H04L 1/1896 |
| 2021/0314099 A1* | 10/2021 | Lei | H04L 1/1896 |
| 2021/0328728 A1* | 10/2021 | El Hamss | H04L 5/0082 |
| 2021/0336726 A1* | 10/2021 | Takeda | H04L 1/1825 |
| 2022/0052793 A1* | 2/2022 | Bao | H04L 1/1822 |
| 2022/0070900 A1* | 3/2022 | Yin | H04L 1/0003 |
| 2022/0104056 A1* | 3/2022 | Takeda | H04L 5/0053 |
| 2022/0123906 A1* | 4/2022 | Wu | H04L 1/1812 |
| 2022/0256543 A1* | 8/2022 | Tian | H04L 5/0091 |
| 2022/0279538 A1* | 9/2022 | Jung | H04L 5/0044 |
| 2022/0321277 A1* | 10/2022 | Babaei | H04L 1/1896 |
| 2022/0377812 A1* | 11/2022 | Jung | H04L 5/0053 |
| 2023/0079660 A1* | 3/2023 | Fu | H04W 72/23 370/329 |
| 2023/0262708 A1* | 8/2023 | Golitschek Edler Von Elbwart | H04W 72/21 370/329 |

FOREIGN PATENT DOCUMENTS

| | | |
|---|---|---|
| CN | 108306720 A | 7/2018 |
| WO | 2017186174 A1 | 11/2017 |
| WO | 2020033237 A1 | 2/2020 |

OTHER PUBLICATIONS

U.S. Appl. No. 62/713,519 Specification (Year: 2018).*
U.S. Appl. No. 62/670,517 (Year: 2018).*
EPO Extended European Search Report for EP Application No. 19848189.7; Date of Mailing, Mar. 30, 2022.
Huawei, "NR frame structure and scheduling on unlicensed bands", 3GPP TSG WG1 Meeting #92bis, R1-1803678; Apr. 16-20, 2018; 8 pages.
IPIN First Examination Report for corresponding IN Application No. 202117009283; Mailing date: Feb. 2, 2022.
Qualcomm Incorporated, "Summary of Maintenance for DL/UL Scheduling", 3GPP TSG-RAN WG1 Meeting #93, R1-1807752; May 21-25, 2018; 29 pages.
International Search Report for International Application No. PCT/CN2019/093017; Date of Mailing, Sep. 20, 2019.
Qualcomm Incorporated, "Summary of DL/UL Scheduling and HARQ Management", 3GPP TSG-RAN WG1 Meeting AH 1801; R1-1803337, Mar. 2, 2018; 20 pages.

* cited by examiner

METHOD FOR INDICATING TIME DIFFERENCE BETWEEN PUCCH AND PDSCH, BASE STATION, AND READABLE MEDIUM

CROSS-REFERENCE TO RELATED APPLICATIONS

This is the U.S. national stage of application No. PCT/CN2019/093017 filed on Jun. 26, 2019. Priority under 35 U.S.C. § 119(a) and 35 U.S.C. § 365(b) is claimed from Chinese Application No. 201810899698.3, filed Aug. 8, 2018; the disclosure of which is also incorporated herein by reference

TECHNICAL FIELD

The present disclosure generally relates to communication technology field, and more particularly, to a method for indicating a time difference between a PUCCH and a PDSCH, a base station and a readable medium.

BACKGROUND

It is supported by the 3rd Generation Partnership Project (3GPP) standards organization to deploy a New Radio (NR) network on an unlicensed spectrum, so as to achieve fair and effective usage of the unlicensed spectrum and increase a data transmission rate of NR systems. There are three main ways for the NR network to use the unlicensed spectrum. The first one includes a User Equipment (UE) accessing a NR cell of an unlicensed spectrum as a primary cell, the second one includes a UE accessing a NR cell of an unlicensed spectrum through a Long Term Evolution (LTE) cell, and the third one includes a UE accessing a NR cell of an unlicensed spectrum through a NR cell. In the second and third ways, a licensed spectrum and an unlicensed spectrum are used cooperatively through carrier aggregation, that is, a terminal and an Evolved Node B (eNB) may simultaneously operate on the licensed spectrum and the unlicensed spectrum, which is called New RAT unlicense (NR-U) technology.

A Physical Uplink Control Channel (PUCCH) is a physical channel of uplink in a NR system, and used to carry Uplink Control Information (UCI). When a UE is not scheduled i.e., when no Uplink Shared Channel (UL-SCH) resources are allocated for the UE, the PUCCH may be used to transfer L1/L2 control information including a channel state report, such as Precoding Matrix Indicator (PMI) or Channel Quality Indicator (CQI), HARQ ACK/NACK acknowledgement, Scheduling Request (SR) and so on. The PUCCH supports multiple transmission formats including: PUCCH format 0, PUCCH format 1, PUCCH format 2, PUCCH format 3 and PUCCH format 4, where PUCCH format 1, PUCCH format 3 and PUCCH format 4 format account for a larger number of Orthogonal Frequency Division Multiplexing (OFDM) symbols, and are called long PUCCHs.

For a time slot where a HARQ-ACK feedback of a Physical Downlink Shared Channel (PDSCH) scheduled by DCI is located, if high-layer signaling dl-DataToUL-ACK is configured with multiple values, a PDSCH-to-HARQ-timing-indicator field (i.e., a timing indication field from the PDSCH to HARQ) in the DCI is used to indicate a time slot interval between the UE receiving the PDSCH and transmitting a PUCCH HARQ-ACK feedback. If the higher-layer signaling dl-DataToUL-ACK is configured with one value, the one value is directly used as a HARQ-ACK feedback time slot deviation. For a PDSCH without DCI scheduling, for example, a Semi-Persistent Scheduling (SPS) PDSCH, its corresponding HARQ-ACK feedback time slot is indicated by higher-layer signaling.

In a NR-U system, before transmission of any uplink channel or downlink channel, a channel must be seized. For HARQ-ACK PUCCH, there are three transmission methods. The first one includes feeding back corresponding HARQ-ACK information within a DL Channel Occupy Time (COT) where the PDSCH is currently transmitted. The second one includes feeding back, in a next DL, COT HARQ-ACK information of PDSCH in a previous COT. The third one includes instructing a UE to access a channel by itself and transmitting HARQ-ACK information after success. For the third method, as a base station cannot predict the time of the next DL COT at a time of the current COT indicating the HARQ-ACK feedback, the base station cannot explicitly indicate a time difference (i.e., a time slot derivation) between PDSCH and HARQ-ACK feedback when scheduling the PDSCH in the previous COT, thereby resulting in the UE not being able to accurately learn the time slot for feeding back HARQ-ACK.

SUMMARY

Embodiments of the present disclosure may enable a UE to accurately learn a time slot for feeding back HARQ-ACK.

In an embodiment of the present disclosure, a method for indicating a time difference between a PUCCH and a PDSCH is provided, including: determining whether a PDSCH-to-HARQ-timing-indicator field indicates the time difference between the PDSCH and the PUCCH used to feed back HAW-ACK, to obtain an indication result; generating indication information based on the indication result; and indicating the indication information to the UE through downlink control information.

Optionally, indicating the indication information to the UE through downlink control information includes: indicating the indication information to the UE through one bit of the downlink control information, wherein a bit value of 0 indicates that the PDSCH-to-HARQ-timing-indicator field indicates the time difference between the PDSCH and the PUCCH used to feed back HARQ-ACK, and a bit value of 1 indicates that the PDSCH-to-HARQ-timing-indicator field does not indicate the time difference between the PDSCH and the PUCCH used to feed back HARQ-ACK.

Optionally, indicating the indication information to the UE through downlink control format includes: indicating the indication information to the UE through an index value of the PDSCH-to-HARQ-timing-indicator field in the downlink control information.

Optionally, indicating the indication information to the UE through an index value of the PDSCH-to-HARQ-timing-indicator field in the downlink control information includes: the index value of I−1 indicating that the PDSCH-to-HARQ-timing-indicator field indicates the time difference between the PDSCH and the PUCCH used to feed back HARQ-ACK; or the index value of M indicating that the PDSCH-to-HARQ-timing-indicator field does not indicate the time difference between the PDSCH and the PUCCH used to feed back HARQ-ACK, wherein I is the number of offset values between a reception time of the PDSCH and a feedback time of HARQ-ACK which are indicated by a base station, and M is a greatest value of the index value.

Optionally, when I is smaller than M, the index values I to (M−1) are reserved bits.

In an embodiment the present disclosure, a base station is provided, including: a determination circuitry configured to determine whether a PDSCH-to-HARQ-timing-indicator field indicates a time difference between PDSCH and a PUCCH used to feed back HARQ-ACK, to obtain an indication result; a generation circuitry configured to generate indication information based on the indication result; and an indication circuitry configured to indicate the indication information to the UE through downlink control information.

Optionally, the indication circuitry is configured to indicate the indication information to the UE through one bit of the downlink control information, wherein a bit value of 0 indicates that the PDSCH-to-HARQ-timing-indicator field indicates the time difference between the PDSCH and the PUCCH used to feed back HARQ-ACK, and a bit value of 1 indicates that the PDSCH-to-HARQ-timing-indicator field does not indicate the time difference between the PDSCH and the PUCCH used to feed hack HARQ-ACK.

Optionally, the indication circuitry is configured to indicate the indication information to the UE through an index value of the PDSCH-to-HARQ-timing-indicator field in the downlink control information.

Optionally, the index value indicating that the PDSCH-to-HARQ-timing-indicator field indicates the time difference between the PDSCH and the PUCCH used to feed back HARQ-ACK; or the index value of M indicating that the PDSCH-to-HARQ-timing-indicator field does not indicate the time difference between the PDSCH and the PUCCH used to feed back HARQ-ACK, wherein I is the number of offset values between a reception time of the PDSCH and a feedback time of HARQ-ACK which are indicated by a base station, and M is a greatest value of the index value.

Optionally, when I is smaller than M, the index values I to (M−1) are reserved bits.

In an embodiment of the present disclosure, a nonvolatile or nontransitory computer readable storage medium having computer instructions stored therein is provided, wherein when the computer instructions are executed, any one of the above methods is performed.

In an embodiment of the present disclosure, a base station including a memory and a processor is provided, wherein the memory has computer instructions stored therein, and when the processor executes the computer instructions, any one of the above methods is performed.

Embodiments of the present disclosure may provide following advantages.

In embodiments of the present disclosure, whether PDSCH-to-HARQ-timing-indicator field indicates the time difference between the PDSCH and the PUCCH used to feed back HARQ-ACK is determined to obtain an indication result, indication information is generated based on the indication and the indication information is indicated to the UE through downlink control information. By the embodiments, the UE is able to accurately acquire a time slot for feeding back HARQ-ACK while the time difference between the PDSCH and the PUCCH used to feed back the HARQ-ACK is indicated by the PDSCH-to-HARQ-timing-indicator field.

DETAILED DESCRIPTION

In the existing NR-U system, as a base station cannot predict the time of the next DL COT at a time of the current COT indicating the HARQ-ACK feedback, the base station cannot explicitly indicate a time difference (i.e., a time slot derivation) between PDSCH and HARQ-ACK feedback when scheduling the PDSCH in the previous COT, thereby resulting in the UE not being able to accurately learn the time slot for feeding back HARQ-ACK.

In embodiments of the present disclosure, whether PDSCH-to-HARQ-timing-indicator field indicates the time difference between the PDSCH and the PUCCH used to feed back HARQ-ACK is determined to obtain an indication result, indication information is generated based on the indication result, and the indication information is indicated to the UE through downlink control information. By the embodiments, the UE is able to accurately acquire a time slot for feeding back HARQ-ACK while the time difference between the PDSCH and the PUCCH used to feed back the HARQ-ACK is indicated by the PDSCH-to-HARQ-timing-indicator field.

In order to clarify the objects, characteristics and advantages of the disclosure, embodiments of present disclosure will be described in detail in conjunction with accompanying drawings.

Figure 1:
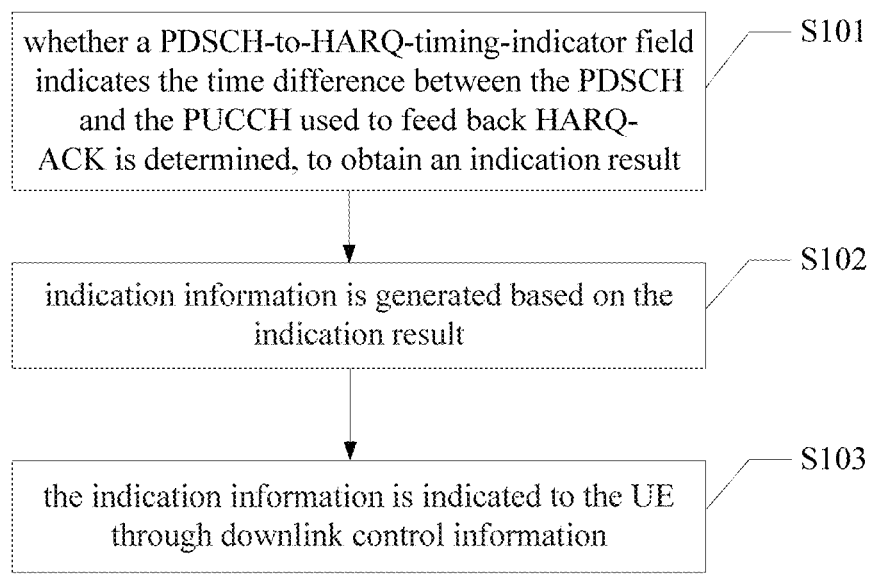
FIG. 1 is a flow chart of a method for indicating a time difference between a PUCCH and a PDSCH according to an embodiment.

FIG. 1 is a flow chart of a method for indicating a time difference between a PUCCH and a PDSCH according to an embodiment. Referring to FIG. 1, the method may include S101, S102 and S103.

In S101, whether a PDSCH-to-HARQ-timing-indicator field indicates the time difference between the PDSCH and the PUCCH used to feed back HARQ-ACK is determined, to obtain an indication result.

As described in the background, for the third transmission method of HARQ-ACK PUCCH (i.e., instructing a UE to access a channel by itself and transmitting HARQ-ACK information after success), as a base station cannot predict the time of the next DL COT at a time of the current COT indicating the HARQ-ACK feedback, the base station cannot explicitly indicate a time difference (i.e., a time slot derivation) between PDSCH and HARQ-ACK feedback when scheduling the PDSCH in the previous COT, thereby resulting in the UE not being able to accurately learn the time slot for feeding back HARQ-ACK. Therefore, in embodiments of the present disclosure, downlink control information may be used to explicitly indicate the time difference between the PDSCH and the PUCCH used to feed back HARQ-ACK.

In S102, indication information is generated based on the indication result.

In some embodiments, the indication result includes the PDSCH-to-HARQ-timing-indicator field indicates the time difference (PDSCH-to-HARQ-timing) between the PDSCH and the PUCCH used to feed back HARQ-ACK or the PDSCH-to-HARQ-timing-indicator field does not indicate the time difference (PDSCH-to-HARQ-timing) between the PDSCH and the PUCCH used to feed back HARQ-ACK.

In some embodiments, if the PDSCH-to-HARQ-timing-indicator field indicates PDSCH-to-HARQ-timing, means that the PDSCH-to-HARQ-timing-indicator field indicates an actual PDSCH-to-HARQ-timing; and if the PDSCH-to-HARQ-timing-indicator field does not indicate PDSCH-to-HARQ-timing, it means that the PDSCH-to-HARQ-timingindicator field indicates an uncertain PDSCH-to-HARQ-timing, and subsequent explicit indication information is needed, where a certain PUCCH subsequent explicitly indicated is to be used.

In S103, the indication in s indicated to the UE through downlink control information.

In some embodiments, the indication information may be indicated to the UE through one bit of the downlink control information, wherein a bit value of 0 indicates that the PDSCH-to-HARQ-timing-indicator field indicates the time difference between the PDSCH and the PUCCH used to feed back HARQ-ACK, and a bit value of 1 indicates that the PDSCH-to-HARQ-timing-indicator field does not indicate the time difference between the PDSCH and the PUCCH used to feed back HARQ-ACK.

Alternatively, in some embodiments, a bit value of 1 indicates that the PDSCH-to-HARQ-timing-indicator field indicates the time difference between the PDSCH and the PUCCH used to feed back HARQ-ACK, and a bit value of 0 indicates that the PDSCH-to-HARQ-timing-indicator field does not indicate the time difference between the PDSCH and the PUCCH used to feed back HARQ-ACK.

In some embodiments, the indication information may be indicated to the UE through an index value of the PDSCH-to-HARQ-timing-indicator field in the downlink control information.

In some embodiments, indicating the indication information to the UE through an index value of the PDSCH-to-HARQ-timing-indicator field in the downlink control information includes: the index value of M indicating that the PDSCH-to-HARQ-timing-indicator field indicates the time difference between the PDSCH and the PUCCH used to feed back HARQ-ACK, i.e., the PDSCH-to-HARQ-timing-indicator field indicating an actual PDSCH-to-HARQ-timing; or the index value of M indicating that the PDSCH-to-HARQ-timing-indicator field does not indicate the time difference between the PDSCH and the PUCCH used to feed back HARQ-ACK, wherein I is the number of offset values between a reception time of the PDSCH and a feedback time of HARQ-ACK which are indicated by a base station (i.e., the number of configured values of dl-DataToUL-ACK indicated by the base station), and M is a greatest value (Max Value) of the index value.

In some embodiments, the base station may indicate to the UE the number of offset values between the reception time of the PDSCH and the feedback time of HARQ-ACK through high-layer signaling.

In some embodiments, when I is not equal to M, for example, smaller than M, the index values I to (M−1) are reserved bits.

In some embodiments, when the base station indicates the indication information to the UE through the downlink control information, the UE can indicate the time difference between the PDSCH and the PUCCH used to feed hack HARQ-ACK in the PDSCH-to-HARQ-timing-indicator field based on the indication information, to accurately learn the time slot for feeding back HARQ-ACK to further perform HARQ-ACK feedback. When the PDSCH-to-HARQ-timing-indicator field does not indicate the time difference between the PDSCH and the PUCCH used to feed back HARQ-ACK, HARQ-ACK feedback is not performed to wait for a next explicit indication information.

In some embodiments, detailed solutions of HARQ-ACK feedback can be referred to existing technical solutions, and are not described here.

By the above embodiments, whether a PDSCH-to-HARQ-timing-indicator field indicates the time difference between the PDSCH and the PUCCH used to feed back HARQ-ACK is determined to obtain an indication result, indication information is generated based on the indication result, and the indication information is indicated to the UE through downlink control information, so that the UE is able to accurately acquire a time slot for feeding back HARQ-ACK while the time difference between the PDSCH and the PUCCH used to feed back the HARQ-ACK is indicated by the PDSCH-to-HARQ-timing-indicator field.

Figure 2:
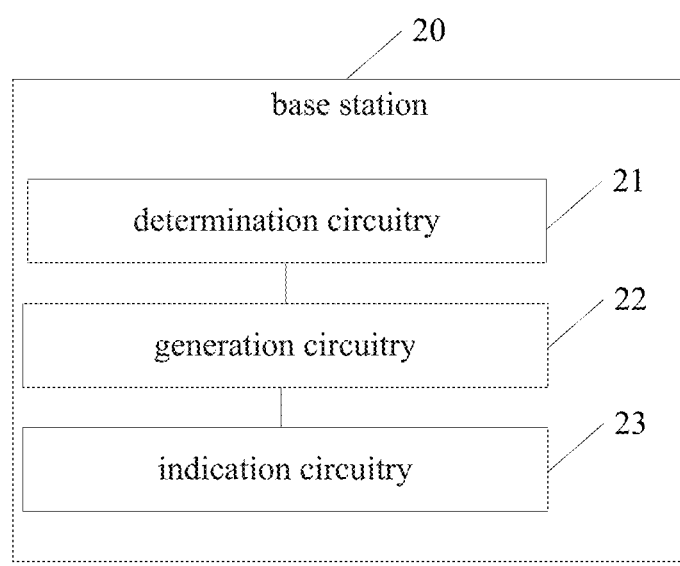
FIG. 2 is a structural diagram of a base station according to an embodiment.

To enable those skilled in the art to better understand and implement the present disclosure, an embodiment of the present disclosure further provides a base station capable of performing the above method, as shown in FIG. 2.

Referring to FIG. 2, the base station 20 may include a determination circuitry 21, a generation circuitry 22 and an indication circuitry 23.

The determination circuitry 21 is configured to determine whether a PDSCH-to-HARQ-timing-indicator field indicates a time difference between a PDSCH and a PUCCH used to feed back HARQ-ACK, to obtain an indication result.

The generation circuitry 22 is configured to generate indication information based on the indication result.

The indication circuitry 23 is configured to indicate the indication information to the UE through downlink control information.

In some embodiments, the indication circuitry 23 is configured to indicate the indication information to the UE through one bit of the downlink control information, wherein a bit value of 0 indicates that the PDSCH-to-HARQ-timing-indicator field indicates the time difference between the PDSCH and the PUCCH used to feed back HARQ-ACK, and a bit value of 1 indicates that the PDSCH-to-HARQ-timing-indicator field does not indicate the time difference between the PDSCH and the PUCCH used to feed back HARQ-ACK.

In some embodiments, the indication circuitry 23 is configured to indicate the indication information to the UE through an index value of the PDSCH-to-HARQ-timing-indicator field in the downlink control information.

In some embodiments, the index value of I−1 indicating that the PDSCH-to-HARQ-timing-indicator field indicates the time difference between the PDSCH and the PUCCH used to feed hack HARQ-ACK; or the index value of M indicating that the PDSCH-to-HARQ-tinning-indicator field does not indicate the time difference between the PDSCH and the PUCCH used to feed back HARQ-ACK, wherein I is the number of offset values between a reception time of the PDSCH and a feedback time of HARQ-ACK which are indicated by a base station, and M is a greatest value of the index value.

In some embodiments, when is smaller than M, the index values I to (M−1) reserved bits.

More details of working procedures and principles of the base station 20 can be found in the above descriptions of the method, and are not described in detail here.

In an embodiment of the present disclosure, a nonvolatile or nontransitory computer readable storage medium having computer instructions stored therein is provided, wherein when the computer instructions are executed, any one of the above methods is performed.

In an embodiment of the present disclosure, a base station including a memory and a processor is provided, wherein the memory has computer instructions stored therein, and when the processor executes the input instructions, any one of the above methods is performed.

Those skilled in the art could understand that all or parts of the steps in the various methods of the above-mentioned embodiments may be completed by a program instructing relevant hardware, and the program may be stored in any computer-readable storage medium. The storage medium may include a Read Only Memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for indicating a time difference between a Physical Uplink Control Channel (PUCCH) and a Physical Downlink Shared Channel (PDSCH), comprising:
   transmitting the PDSCH to a User Equipment (UE);
   determining whether a PDSCH-to-HARQ-timing-indicator field indicates the time difference between the PDSCH and the PUCCH used to feed back HARQ-ACK, to obtain an indication result;
   generating an index value of the PDSCH-to-HARQ-timing-indicator field in downlink control information based on the indication result; and
   indicating to the UE the index value of the PDSCH-to-HARQ-timing-indicator field in the downlink control information;
   wherein the PDSCH-to-HARQ-timing-indicator field not indicating the time difference between the PDSCH and the PUCCH used to feed back HARQ-ACK makes the UE wait for subsequent explicit indication information for performing a HARQ-ACK feedback to the PDSCH received by the UE.

2. The method according to claim 1, wherein said indicating to the UE the index value of the PDSCH-to-HARQ-timing-indicator field in the downlink control information comprises:
   the index value of I−1 indicating that the PDSCH-to-HARQ-timing-indicator field indicates the time difference between the PDSCH and the PUCCH used to feed back HARQ-ACK; or
   the index value of M indicating that the PDSCH-to-HARQ-timing-indicator field does not indicate the time difference between the PDSCH and the PUCCH used to feed back HARQ-ACK,
   wherein I is the number of offset values between a reception time of the PDSCH and a feedback time of HARQ-ACK which are indicated by a base station, and M is a greatest value of the index value.

3. The method according to claim 2, wherein when I is smaller than M, the index values I to (M−1) are reserved bits.

4. A base station, comprising:
   a transmitting circuitry configured to transmit a Physical Downlink Shared Channel (PDSCH) to a User Equipment (UE);
   a determination circuitry configured to determine whether a PDSCH-to-HARQ-timing-indicator field indicates a time difference between the PDSCH and a Physical Uplink Control Channel (PUCCH) used to feed back HARQ-ACK, to obtain an indication result;
   a generation circuitry configured to generate an index value of the PDSCH-to-HARQ-timing-indicator field in downlink control information based on the indication result; and
   an indication circuitry configured to indicate to the UE the index value of the PDSCH-to-HARQ-timing-indicator field in the downlink control information;
   wherein the PDSCH-to-HARQ-timing-indicator field not indicating the time difference between the PDSCH and the PUCCH used to feed back HARQ-ACK makes the UE wait for subsequent explicit indication information for performing a HARQ-ACK feedback to the PDSCH received by the UE.

5. The base station according to claim 4, wherein the index value of I−1 indicates that the PDSCH-to-HARQ-timing-indicator field indicates the time difference between the PDSCH and the PUCCH used to feed back HARQ-ACK; or
   the index value of M indicates that the PDSCH-to-HARQ-timing-indicator field does not indicate the time difference between the PDSCH and the PUCCH used to feed back HARQ-ACK,
   wherein I is the number of offset values between a reception time of the PDSCH and a feedback time of HARQ-ACK which are indicated by a base station, and M is a greatest value of the index value.

6. The base station according to claim 5, wherein when I is smaller than M, the index values I to (M−1) are reserved bits.

7. A nonvolatile or nontransitory computer readable storage medium having computer instructions stored therein, wherein when the computer instructions are executed, the method of claim 1 is performed.

8. A base station comprising a memory and a processor, wherein the memory has computer instructions stored therein, and when the processor executes the computer instructions, the method of claim 1 is performed.

* * * * *